April 18, 1950  A. C. PURPURA  2,504,728
AUTOMATIC COFFEE MAKER
Filed April 10, 1948  2 Sheets-Sheet 1
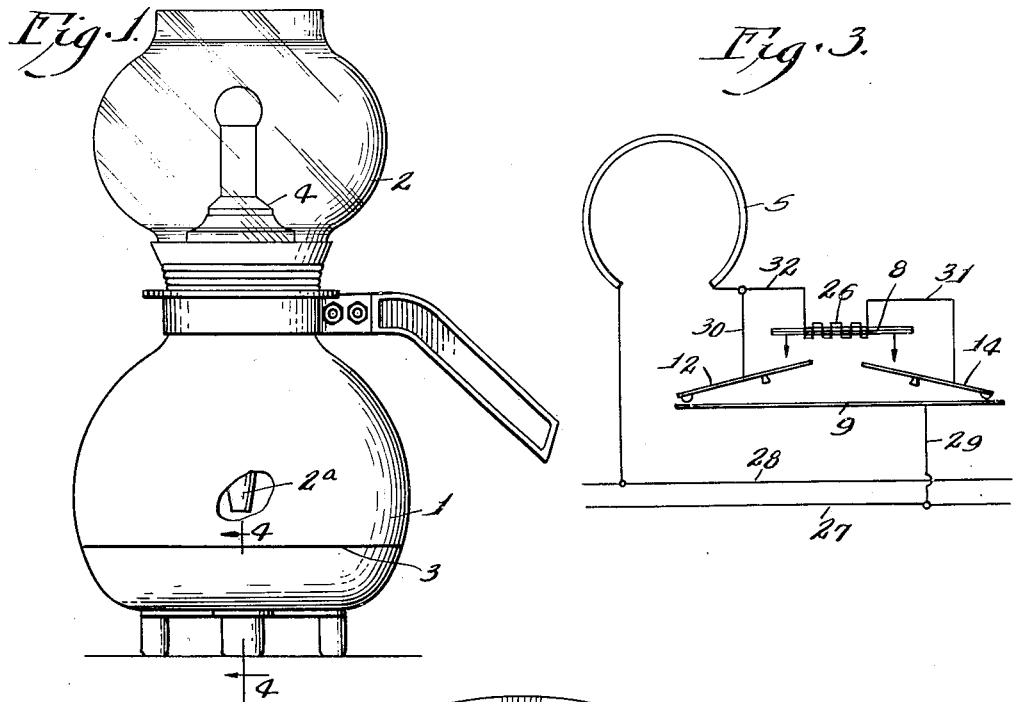
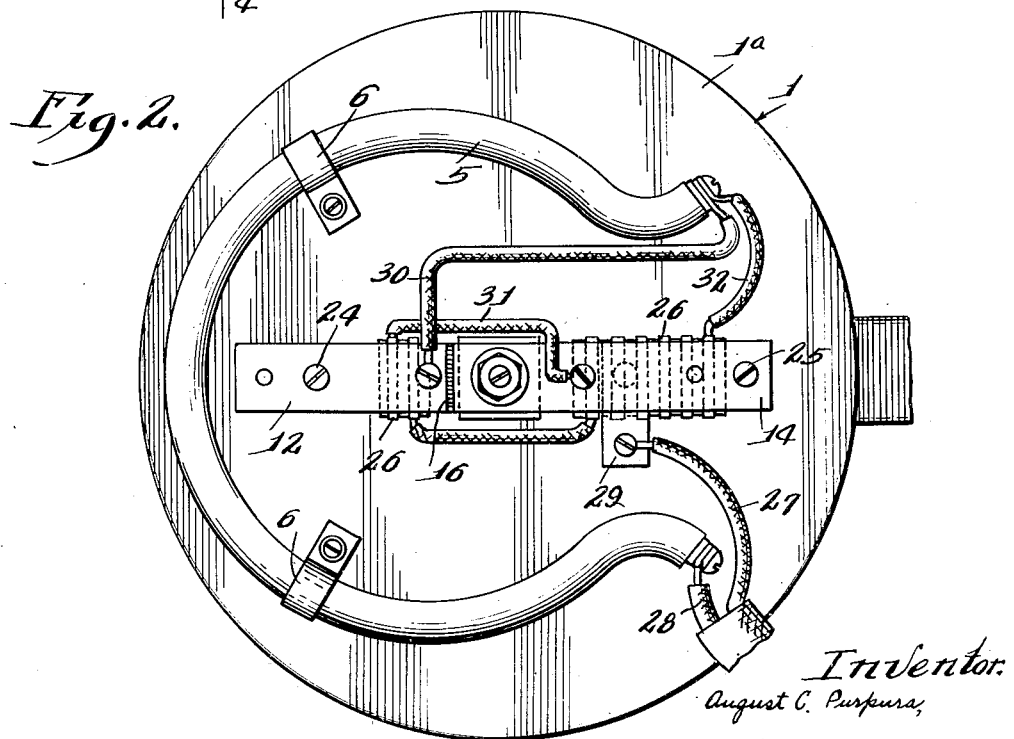

April 18, 1950   A. C. PURPURA   2,504,728
AUTOMATIC COFFEE MAKER
Filed April 10, 1948   2 Sheets-Sheet 2
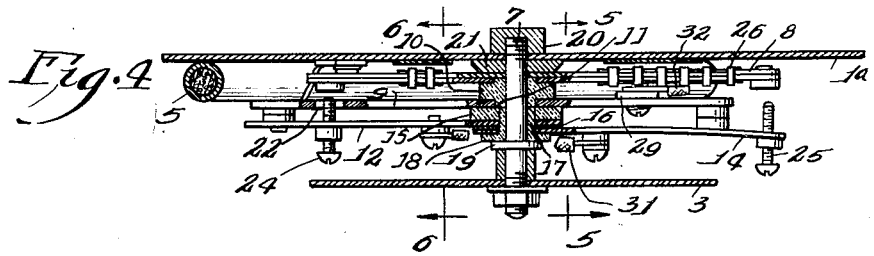
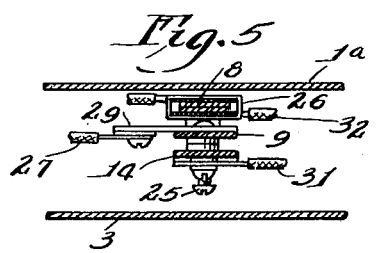   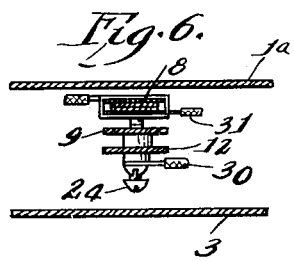
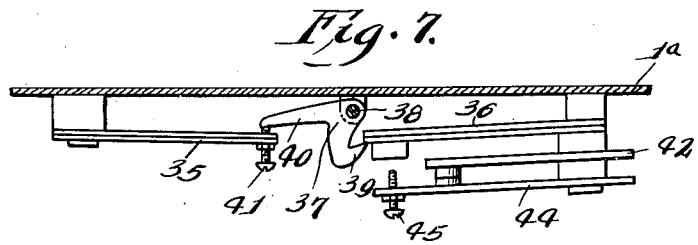
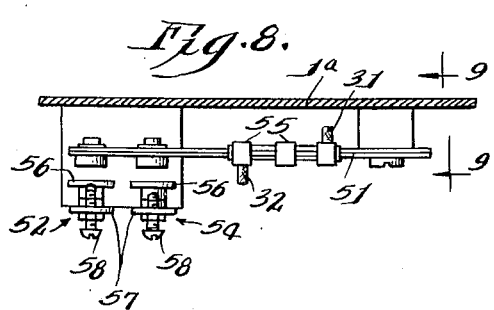   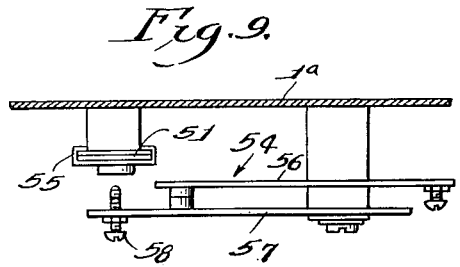
Inventor.
August C. Purpura,
Wm. F. Freudenreich,
By.
Attorney.

Patented Apr. 18, 1950

2,504,728

UNITED STATES PATENT OFFICE 2,504,728

AUTOMATIC COFFEE MAKER

August C. Purpura, Chicago, Ill., assignor to Sunbeam Corporation, Chicago, Ill., a corporation of Illinois Application April 10, 1948, Serial No. 20,205

7 Claims. (Cl. 219—43)

In one of the various types of utensils for brewing coffee, there is a pot into which water is placed and in which the liquid coffee is stored at the end of the brewing process; the dry comminuted coffee bean material being placed in a bowl having a conical, spout-like downward extension that reaches almost to the bottom of the pot when the bowl is set on the pot; a strainer being arranged in the bowl to permit liquid to be driven up into the latter by vapor pressure generated in the pot, when the water is heated, and to flow down again after brewing is completed.

After the coffee has been brewed it is desirable that it be kept hot until used.

The present invention has for its object to make it possible to heat a coffee pot of the aforesaid type electrically in such manner that, after turning on the electric current, the pot will be heated to the proper temperature to drive the water into the upper bowl and the heating will be automatically regulated to allow the brewed coffee to flow down into the pot and there be kept hot indefinitely.

In carrying out my invention I employ a suitable electrical heating element for the pot, together with an energizing circuit therefor controlled by a heat responsive means, heated by the pot, to determine the temperature during the brewing period. A further object of the invention is to provide simple and novel means automatically to heat the heat responsive means additionally from another source than the pot itself, after the brewing temperature is reached, to provide sufficient power to operate the controls even though the temperature of the pot be thereafter maintained at a much lower level.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is an elevational view of a utensil to which my invention has been applied; Fig. 2 is a bottom plan view of the utensil, on a larger scale, with the false bottom or base removed; Fig. 3 is a wiring diagram of the heating and control system; Fig. 4 is a section on the line 4—4 of Fig. 1, the scale being the same as that of Fig. 2; Figs. 5 and 6 are sections taken respectively on line 5—5 and 6—6 of Fig. 4; Fig. 7 is a view similar to Fig. 4, but only fragmentary, showing a modification containing a single switch; Fig. 8 is a view similar to Fig. 7, showing a further modification; and Fig. 9 is a section taken on line 9—9 of Fig. 8.

In Fig. 1 of the drawings I have illustrated a conventional type of coffee brewing utensil (such as disclosed in Patent No. 2,376,410, of May 5, 1945, for example); there being a pot proper 1, surmounted by a transparent glass brewing bowl 2 having a long conical spout $2^a$ that extends down into the pot. A dish-shaped member 3, secured to the under side of the pot, serves as a base and forms with a pot bottom a chamber to house the heating and control system. There is contained in the bowl a strainer 4 that allows liquids to move in either directions between pot and bowl.

The preferred form of heating and control system, forming the subject of the present invention, is shown in Figs. 2 to 6. Referring to them, 5 is any suitable electrical heating element held against the bottom wall $1^a$ of pot 1, by suitable clamps 6, or otherwise. A control assembly is also mounted on said wall by a bolt-like fastening member and post 7 that extends through the wall axially of the pot.

The part of the control assembly nearest the wall is a bimetallic heat-responsive bar 8 in good heat-conductive relation with the latter; the bar extending in opposite directions from the post. Below, parallel to and spaced from bar 8 is a somewhat longer bar 9 constituting the stationary blades of two switches. Bar 9 is insulated from the post by a washer-like part 10 of insulating material that lies between the two bars and has a hub 11 extending down through bar 9. Below and parallel to bar 9 are two resilient switch blades 12 and 14 to form with the bar two switches that will hereinafter be referred to by these two numbers, the two blades underlying the two corresponding arms or halves of bar 9. Blade 12 bears against the under side of a washer 15 of insulating material that serves as a spacer between the blade and bar 9. Below, and spaced therefrom by a sheet 16 of mica, is the blade 14. Extending through both blades, the sheet of mica and washer 15, is a sleeve 17 of insulating material. On the lower end of the sleeve is a flange 18 that insulates the blade 14 from a collar 19 integral with the post. It is therefore this collar that supports the switches and the thermostat and which serves as one side of a clamp, of which the other is the bottom wall of the pot, to hold the switches and the bimetal bar in place; the upper end of the post being pushed up through the central hole in said wall and being there provided with a nut 20. In order to permit the thermostat bar to flex freely and yet be in good heat-conducting relation with the pot wall, a metal washer 21 is placed between the wall and the bar.

The stationary arm of switch 12 contains a hole 22 not far from its free end, and the movable blade of that switch carries an adjustable screw 24 extending vertically through said hole toward the overlying bimetallic bar. The movable blade of switch 14 projects beyond the corresponding end of the cooperating, stationary switch arm and is there provided with a screw 25, similar to screw 24, that extends up toward the adjacent end of the bimetallic bar.

On the bimetallic bar is a heating coil 26 of which at least the main portion is on that part of the bar lying above switch 14.

The pot heating element, the heating coil on the bimetallic element and the switches are connected into a unitary system by means of suitable conductors, as illustrated diagrammatically in Fig. 3. Referring to this diagram, 27 and 28 are lead in wires for supplying electric current. Wire 27 is connected to arm 9, common to both switches, by a wire 29, whereas wire 28 leads directly to one terminal of pot heating elements 5. The movable blade of switch 12 is connected to the second terminal of element 5 by a wire 30. The movable blade of switch 14 is connected to one terminal of coil 26 by a wire 31; the other terminal of this coil being connected to the said second terminal of heating element 5 by wire 32.

Normally both switches are closed as shown in the drawings. When coffee is to be brewed, the glass bowl is removed and the required amount of water is introduced into the pot, proper. The bowl is then replaced and the dry comminuted coffee is deposited in the same, the strainer preventing it from flowing down into the pot. Assuming that the wires 27 and 28 form part of the usual cord, with which electric cooking utensils are provided, such cord is plugged into a convenient socket, energizing the entire heating and control system heretofore described. It will be seen that at this time pot heating element 5 is connected directly across the line; whereas heating coil 26 is also connected across the line, but in series with the pot heating element. In other words, current can reach the pot heating element either directly through switch 12 or through switch 14. However, since the latter path includes the coil 26, its resistance is so much greater than that of the direct path that little current follows the same, and there need be little or no heating of the coil. In other words, the bimetal bar need receive practically no other heat than that delivered by the pot. As the temperature of the pot rises, fluid pressure is built up in the pot above the water and, finally, the water is driven up through the spout and strainer into the glass bowl.

I have found that when a pot temperature of about 320° F., is reached, the brewing of the coffee has advanced to the point at which the temperature may again be reduced so that the brewed coffee may flow down into the pot. The parts are therefore so designed that when this maximum temperature is attained, the bimetal bar becomes sufficiently bowed to reach and press down screw 24; thereby opening switch 12. Now all the current that flows through the pot heating element also flows through the coil on the bimetallic bar; this coil becoming hot, so that the bar now receives heat from two separate sources.

The result is that the bar becomes still more sharply bowed and opens switch 14; both switches being then open and the supply of current to the pot heating element interrupted. The design of the parts to effect the successive opening of the switches may be varied. A simple way is to adjust screw 25 so that the bimetal bar does not bow sufficiently to reach it until the temperature of the bar has been increased above that required to open switch 12.

With both switches open, the pot begins to cool. However, the coil 26 is of such a character that the bimetal bar remains hot enough to keep switch 12 open until the temperature of the pot falls well below the boiling point of water. The switch 14 is so adjusted that it closes whenever the pot cools to a temperature only a little below the boiling point, say about 195° F. Consequently, switch 14 closes and causes the coil 26 to heat the bimetal bar before the latter can cool sufficiently to allow switch 12 to close. Switch 14 thereafter automatically opens and closes so as to keep the coffee hot indefinitely.

In Fig. 7 there is illustrated a modification that employs only one switch. In this form of the invention there are two bimetallic bars 35 and 36 each anchored at one end to the bottom wall of the pot; they being in the same plane, in alignment with each other and have their free ends spaced apart a short distance from each other. In the gap between the free ends of these members is a latch 37 suspended on a horizontal pivot 38 from the pot. The latch comprises a hook 39 adapted to underlie the free end of bar 36 to latch that bar in an idle position; together with a finger 40 that extends over bar 35 at the free end of the latter. A screw 41 extends up through bar 35 for engagement with the under side of finger 40. The latch is so shaped that it swings by gravity into latching position, avoiding the need for a spring.

Directly under bar 36 is a switch comprising a stationary arm 42 and a resilient arm or blade 44; both anchored at corresponding ends in the vicinity of the anchored end of said bar. Arm 42 is shorter than blade 44 and bar 36, so that a screw 45, extending upward through the blade toward the bar, clears the end of arm 42.

With the construction just described, the heating of bimetal member 35 to the temperature required to open switch 12 in the first form, causes it to trip the catch and allow member 36 to swing down and open the switch; member 35 being deflected upward and member 36 being deflected downward when heated. Therefore, member 36 is placed under stress when heated while in a latched state and opens the switch with a snap action when released. As the pot then cools, member 36 begins to straighten; but, before it swings up far enough to become latched, the switch closes again. Thus, since this cycle automatically repeats itself, after being brewed, the coffee is kept hot in the pot.

In Figs. 8 and 9 there is shown a form of the invention which comprises the same combination of parts as does the first form, only the details being somewhat different. A bimetallic bar 51 is anchored at one end to the bottom of the pot, and its free end extends over two like switches 52 and 54. On the bar is a heating coil 55. Each switch comprises a stationary arm 56 and a resilient blade 57; both arms being anchored at one end to the pot and extending at right angles toward bar 51. The resilient blade underlies the stationary arm and extends at its free end past the bar. Carried by and passing through the resilient blade of each switch is a vertical screw 58 in the path of the downward sweep of the free end of the bimetal bar as the latter becomes heated.

The two switches and the coil are intended to be connected in a wiring system just like that in Fig. 3, except that the stationary switch arms 56, being two members instead of only one, must be electrically connected to each other or else each must be connected directly to line wire 27.

At any rate, the operation of this unit and the results obtained therewith are identical with those described in connection with the first form; it being understood that screws 58 are adjusted to cause switch 52 to open first, to be followed by the opening of switch 54, just as in the case of switches 12 and 14, respectively.

In all three forms of my invention adjustments, to alter critical temperatures and timing, are made rapidly and easily, requiring only the turning of one or two screws.

While I have illustrated and described with particularity only a single preferred form of my invention, together with a few modifications, I do not desire to be limited to the exact details thus illustrated and described, but intend to cover all forms and arrangements that come within the definitions of my invention constituting the appended claims.

I claim:

1. Heating means for a coffee pot, comprising an electrical pot heating element, a heat responsive member in good heat-conductive relation with a wall of the pot, a heating means on the heat-responsive member, an energizing circuit for said heating element, a self closing switch in said circuit, cooperating means on said heat responsive member and the switch to open the latter at a maximum pot temperature far above the boiling point of water, a second self-closing switch to cause current to flow through said heating element and said heating means independently of the first switch, and cooperating means on said heat responsive member and the second switch to cause the latter to open after said maximum pot temperature is reached and thereafter to close and open intermittently to allow the pot temperature to drop well below the boiling point and thereafter maintain such lower temperature.

2. Heating means for a coffee pot, comprising an electrical heating element, a heat responsive member in good heat-conductive relation with a wall of the pot, a heating coil for the heat-responsive member, means, including a self-closing switch, to connect the pot heating element directly to a source of current, means, including a second self-closing switch, to connect the pot heating element and the coil to said source in series with each other, cooperating means on the switches and the heat-responsive member to cause the first switch to open when the pot reaches a brewing temperature and thereafter to cause the second switch to open at a somewhat higher temperature; the relative heating capacities of the pot heating element and the coil being such that when they are connected in series with each other to said source, with the first switch open and the second switch closed, the pot remains at a temperature only sufficient to keep the coffee hot while the temperature of the heat responsive member alternately rises to the point at which the second switch opens and falls sufficiently to allow the second switch to close.

3. Heating means for a coffee pot, comprising an electrical heating element, a heat responsive member in good heat-conductive relation with a wall of the pot, a heating coil for the heat responsive member, an energizing circuit for the pot heating element, a self-closing switch in said circuit, a bypass for the aforesaid switch containing said heating coil and a second self-closing switch, and cooperating means on the switches and the heat-responsive member to cause the first switch to open when that member is at the temperature corresponding to a predetermined high temperature of the pot when both switches are closed and thereafter to cause the second switch to open at a somewhat higher temperature; the heating characteristic of the coil being such that, while the only path for the current flowing to the pot heating element is through the coil, the heat responsive member remains sufficiently hot to keep the first switch open although the pot temperature be far below that at which the first switch opens during the time the pot is being heated with both switches closed.

4. Heating means for a coffee pot, comprising an electrical heating element, a heat responsive member in good heat-conductive relation with a wall of the pot, a heating coil for the heat responsive member, an energizing circuit for the pot heating element, a self-closing switch in said circuit, a bypass for the aforesaid switch containing said heating coil and a second self-closing switch, cooperating means on the switches and the heat-responsive member to cause the first switch to open when that member is at the temperature corresponding to a predetermined temperature of the pot when both switches are closed and thereafter to cause the second switch to open at a somewhat higher temperature; whereby, with both switches closed, the heat responsive member is energized mainly by heat received from the pot when both switches are either open or closed; whereas, when the first switch is open and the second switch is closed, the heat supplied by the coil is the controlling factor.

5. A heating means as set forth in claim 1, wherein the heat responsive member is so mounted with respect to the switches that it presses the movable element of the first switch into the open position whenever said member is at or above the predetermined temperature to which it is heated by the pot when the latter is at the maximum temperature, and acts in a like manner on the movable element of the second switch only when the temperature of said member is substantially above said predetermined temperature.

6. A heating means as set forth in claim 1, wherein the heat responsive member is supported at about the middle thereof and the ends of said member are positioned adjacent to the switches, and wherein one end presses the moving element of the first switch into the open position whenever said member is at or above a predetermined temperature to which it is heated by the pot when the latter is at the maximum temperature, while the other end of said member acts in like manner on the movable element of the second switch only when said member is at a temperature substantially above said predetermined temperature.

7. A heating means as set forth in claim 1, wherein the heat responsive member is supported at one end thereof and extends past the movable elements of both switches, one part of said member engaging the movable element of the first switch to open that switch when said member is at or above the predetermined temperature to which it is raised by the pot when the latter is at the maximum temperature, and another part of said member acting in a like manner on the movable element of the second switch only when the temperature of said member is substantially above said predetermined temperature.

AUGUST C. PURPURA.

REFERENCES CITED

The following references are of record in the file of this patent:

UNITED STATES PATENTS

| Number | Name | Date |
|---|---|---|
| 2,076,096 | Samuels et al. | Apr. 6, 1937 |
| 2,287,583 | Weeks | June 23, 1942 |
| 2,386,278 | Strother | Oct. 9, 1945 |
| 2,410,013 | Clark | Oct. 29, 1946 |